F. LAPLANT.
DIAL TEST INDICATOR.
APPLICATION FILED MAR. 29, 1910.
1,056,186.
Patented Mar. 18, 1913.
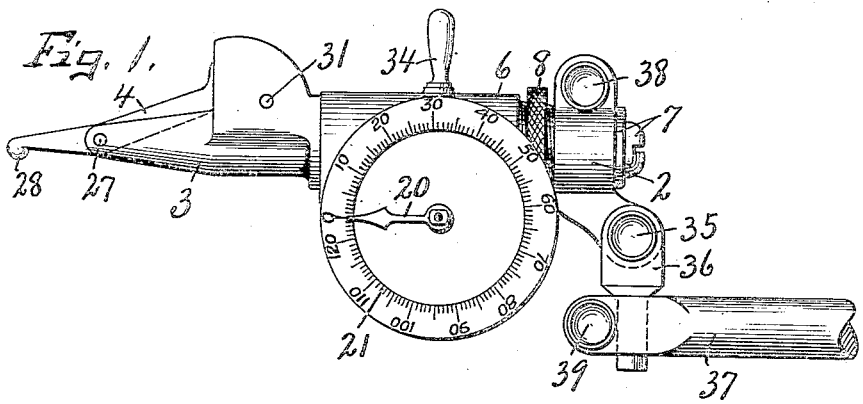
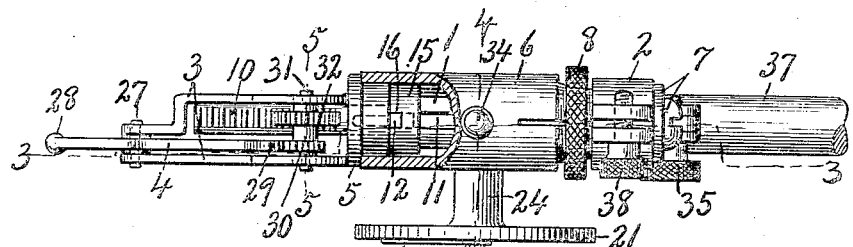
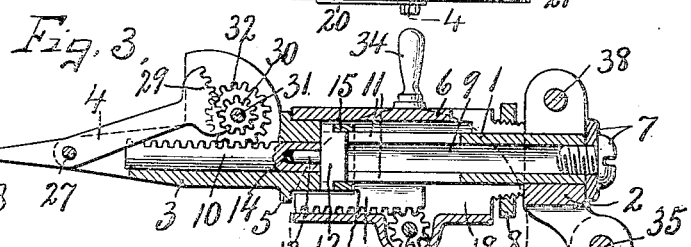
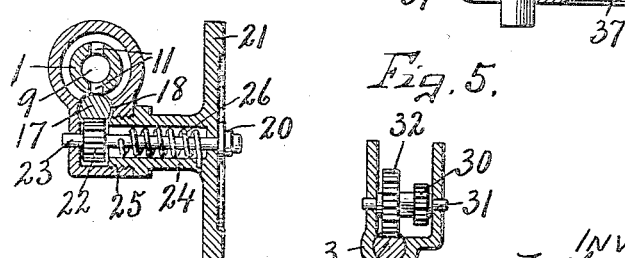
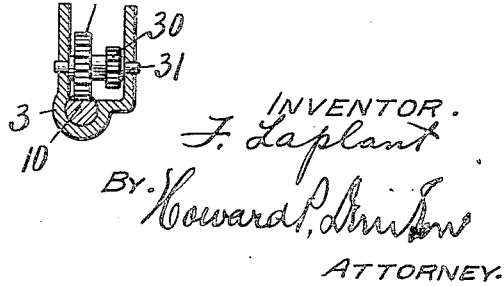
WITNESSES.
INVENTOR.
F. Laplant
BY Howard P. Bristow
ATTORNEY.

UNITED STATES PATENT OFFICE.

FRANK LAPLANT, OF SYRACUSE, NEW YORK.

DIAL TEST-INDICATOR.

1,056,186.　　　Specification of Letters Patent.　　Patented Mar. 18, 1913.

Application filed March 29, 1910. Serial No. 552,268.

*To all whom it may concern:*

Be it known that I, FRANK LAPLANT, of Syracuse, in the county of Onondaga, in the State of New York, have invented new and useful Improvements in Dial Test-Indicators, of which the following, taken in connection with the accompanying drawings, is a full, clear, and exact description.

This invention relates to certain improvements in dial test indicators for testing the accuracy of various kinds of lathe and machine work and at the same time indicating any variations from a predetermined contour or dimension of the surface of the article under test.

The main object is to render the device more universal in its application in testing a greater variety of different kinds of work than has heretofore been practised.

Another object is to provide means whereby the dial may be easily and quickly positioned, so as to be conveniently read in making tests in the various positions to which the instrument may be adjusted.

Other objects and uses relating to specific parts of the device will be brought out in the following description.

In the drawings: Figures 1 and 2 are respectively a side elevation and a top plan partly in section of a dial test indicator involving the various features of my invention. Figs. 3, 4 and 5 are sectional views taken respectively on lines 3—3, 4—4 and 5—5, Fig. 2.

As shown in the drawings, this indicator comprises a hollow cylinder or tubular member —1— journaled at one end in a suitable supporting head —2— and having its opposite end provided with a slotted extension —3— in which is mounted a longitudinally extending lever —4—, said extension being preferably formed integral with the tubular cylinder —1— and being provided at its junction with said cylindrical portion with an enlargement or annular shoulder —5— located some distance from the head —2—.

A cylindrical barrel or sleeve —6— is rotatably mounted upon the tubular portion —1— and is of sufficient length so that its opposite ends abut respectively against the inner face of the head —2— and shoulder —5— to hold it against relative endwise movement upon said tubular portion —1— and at the same time permitting its free rotary movement thereon.

The tube —1— is held against endwise displacement from the head —2— by a suitable shoulder, as a cap screw —7—, which is screwed into a threaded aperture in the adjacent end of the tube —1— and engages the outer end face of the head —2— as clearly shown in Fig. 3, said cap screw also serving to hold the shoulder —5— in engagement with the adjacent end of the sleeve —6— and thus holding the opposite end of the sleeve in engagement with the inner face of the head —2—, so that by removing the screw —7— the tube —1— may be withdrawn from the head —2— whereupon the sleeve —6— may be withdrawn from the end of the tube —1— if necessary.

The end of the sleeve —6— adjacent to the head —2— is preferably split radially at intervals to form spring jaws the ends of which are reduced in diameter and are provided with a tapering thread which is engaged by a correspondingly threaded clamping nut —8— whereby the sleeve —6— may be clamped to the tubular member —1— to rotate both parts together or to frictionally hold the sleeve —6— upon the tubular member —1— against undue relative rotary movement.

The tubular member —1— is provided with a central lengthwise opening —9— preferably circular in cross section to receive and guide a reciprocatory toothed rack —10— of substantially the same cross sectional form and size as the opening —9—, said tubular member —1— being also provided with opposite radial slots —11— for receiving and guiding a sliding cross head —12—. This cross head abuts against the inner end of the toothed rack —10— and is provided with an axially extending stud or spindle —13— which enters a corresponding socket —14— in the inner end of the rack —10— to hold these parts in proper relative position. The thickness of the cross head —12— is substantially equal to the width of the slots —11— so as to prevent lateral play and at the same time establish an easy sliding fit between the cross head and tubular member —1—. The inner end of the cross head is reduced in diametrical length to substantially the exterior diameter of the tubular member —1— thus forming a shoulder upon which is closely fitted a ring or annulus —15— having slots or recesses —16— which receive the radially projecting ends of the cross head so as to hold said cross head and ring against relative rotary movement or rather to cause the ring and cross head to rotate together with the tubular member —1—. The extreme length of the cross head from side to side is substantially equal to the external diameter of the ring —15— which is slightly less than the interior diameter of the sleeve —6— so as to prevent unnecessary friction between the sleeve and sliding cross head and ring. The object of this cross head —12— and ring —15— is to transmit endwise movement from the rack —10— to a separate but similar toothed rack —17— which is also circular in cross section and slidably mounted in a similar circular opening or guide way —18— in the sleeve —6— at one side of but parallel with the tubular member —1— and therefore parallel with the line of movement of the toothed rack —10—. For this purpose the inner side of the front end of the toothed rack —17— is cut away to form a shoulder —19— against which the inner edge of the ring —15— abuts so that when the toothed rack —10— is moved inwardly by suitable means, presently described, similar motion will be imparted to the toothed rack —17— for operating a suitable index finger —20— around a graduated dial —21— through the medium of an intermeshing pinion —22— and spindle —23—.

The dial —21— is provided with a hub —24— threaded at its inner end and screwed into a threaded socket or opening —25— in one side of the sleeve —6— coaxial with the pinion —22— and its supporting spindle —23— and therefore at substantially right angles to the line of movement of the racks —10— and —17—. The opening —25— is slightly larger than the pinion —22—, so that by unscrewing the dial from the sleeve —6— the pinion —22— together with the spindle —23— may be withdrawn through said opening and thus removed with the dial without disconnecting the index finger —20— from the spindle —23—.

A suitable retracting spring —26— is coiled around the spindle —23— within the hub —24— of the dial —21— and has one end secured to the spindle —23— and its other end attached to the hub of the dial in such manner as to retract the indicator and its actuating mechanism to their starting positions, it being understood that the indicator —20— is normally set at zero on the dial —21—.

The normal or starting positions of the indicator and its actuating mechanism are determined by the engagement of the front edge of the cross head —12— with the front end of the slots —11— of the tubular member —1—, the spring —26— operating to rotate the spindle —23— and its pinion —22— to hold the shoulder —19— of the rack —17— in engagement with the inner edge of the ring —15—, thereby pressing the ring against the yoke —12— to hold said yoke against the limiting stop or front end of the slots —11— and at the same time pressing said yoke against the inner end of the toothed rack —10— to yieldingly hold the latter in its normal starting position.

The dial —21— is graduated to read to thousandths of an inch and the actuating members for the index finger —20— are constructed to bring about this result.

The actuating lever —4— is fulcrumed intermediate its ends at —27— upon the extreme front end of the extension —3— of the tubular member —1— and extends lengthwise thereof.

The front arm which is the shorter is provided with a feeler —28— adapted to engage the work under test, while the rear arm which is the longer is provided with a toothed segment —29— meshing with a pinion —30— which is secured to a transverse shaft or spindle —31—, the latter being journaled in suitable bearings on the extension —3—. Upon the same shaft or spindle —31— is secured an additional but somewhat larger gear —32— which meshes with the toothed rack —10— to impart reciprocatory motion thereto as the pinions —31— and —32— are rotated by the segment —29—. The pinions —31— and —32— are therefore coaxial and arranged end to end, so that the toothed segment —29— travels in a plane at one side of the rack —10—.

The sleeve —6— with the dial —21— thereon may be turned upon and relatively to the tubular member —1— to adjust the dial to any convenient position for reading and for this purpose may be provided with a radially projecting handle —34—. In like manner the tubular member —1— carrying the lever —4— and rack —10— may be adjusted rotatively relatively to the sleeve —6— to bring the feeler —28— into various positions for testing interior or exterior cylindrical surfaces or different sides of plane surfaces.

Another important feature of this invention consists in pivoting or hinging the head —2— at —35— to a rotary support —36— which is journaled in a supporting shaft or arm —37—, the latter serving as a means of attachment to a carriage, tool post or other part of a lathe, drill press or milling machine, the method of attachment depending upon the work which is to be tested. The bearing in the head —2— for the tubular member —1— is preferably split through one side and provided with a clamping screw —38— by which the tubular member may be frictionally clamped in its adjusted position. The pivot —35— for connecting the head —2— to the support —36— is disposed at right angles to and at one side of the axis of the tubular member —1— and preferably consists of a clamping screw by which the head —2— may be frictionally clamped in its adjusted position. The journal bearing for the head —36— is disposed at right angles to the axis of the pivot —35— and is split through one side and provided with a clamping screw —39— by which the support —36— may be frictionally locked in its adjusted position to the main support —37—.

It is apparent from the foregoing description that the testing feeler —28— may be swung about the axis of the support —36— to any degree through a complete circle or may be tilted at right angles to the plane of such circle upon the axis of the pivot —35— to any degree with an arc of at least 180° and that it may be rotated about the axis of the tubular member —1— to any degree and that when adjusted to any of its positions the dial —21— may be separately adjusted to bring its graduated face into convenient reading position.

What I claim is:

1. In a dial test indicator, two co-axial relatively rotatable parts one within the other, a dial secured to one of said parts, an index finger movable around the dial, a lever centrally pivoted to the other part and having one end provided with a contact feeler and its other end provided with a toothed segment, a pinion mounted on the part to which the lever is pivoted and meshing with said segment, and means for transmitting motion from said pinion to the index finger.

2. A dial test indicator comprising two relatively rotatable co-axial parts journaled one within the other, a dial secured to the outermost part, an index finger movable around the dial, a lever pivoted to the innermost part and having one end provided with a contact feeler and its opposite end provided with a toothed segment, gears on the innermost part actuated by said toothed segment as the contact feeler is operated, a toothed rack actuated endwise of the innermost part by the gears, and means for transmitting motion from said rack to the index finger.

3. A dial test indicator comprising two co-axial relatively rotatable parts journaled one within the other, a spindle journaled on the outermost part some distance to one side of the inner part, an index finger secured to said spindle, a dial having graduations concentric with said spindle to indicate the position of the index finger, a contact feeler movably mounted upon the inner part, and means for transmitting motion from said contact feeler to the index finger.

4. In a dial test indicator, two relatively rotatable co-axial parts journaled one within the other, each part being rotatable relatively to the other part about their axes, a spindle journaled in the outermost part some distance to one side of the innermost part, a dial secured to said outermost part and having graduations thereon concentric with the spindle, an index finger secured to the spindle, a contact feeler movably mounted on the innermost part, and means for transmitting motion from said feeler to the spindle.

5. In a test indicator, two relatively rotatable co-axial parts journaled one within the other, the inner part having a lengthwise slot, a cross head slidable in said slot, a dial secured to the outer part, an index finger movable around the dial, a contact feeler movably mounted on the inner part, means for transmitting motion from said contact feeler to the cross head, and separate means for transmitting motion from said cross head to the index finger.

6. In a test dial indicator, two co-axial relatively rotatable parts journaled one within the other, an annulus movable lengthwise of and upon the inner part, means for locking the annulus to said inner part to rotate therewith, a dial secured to the outer part, an index finger movable around the dial, a contact feeler movably mounted on the inner part, means for transmitting motion from said contact feeler to the annulus to move the latter axially, and additional means for transmitting motion from the annulus to the index finger.

7. In a dial test indicator, a supporting shank, a head rotatably adjustable on said shank, a yoke pivoted to the head, a sleeve journaled in the yoke, a contact feeler on the sleeve, a dial support rotatably adjustable on the sleeve, a dial on the support, an index finger movable around the dial, mechanism for transmitting motion from the contact feeler to the index finger, and retracting means for said index finger and its actuating mechanism.

8. In a test indicator for lathe and machine work, a rockable head, a rotary member on the head, a sleeve rotatable on said member, a toothed rack slidable in the sleeve, a movable contact feeler on said member, mechanism for transmitting motion from the contact feeler to the toothed rack, and means actuated by said rack for indicating the degree of movement of the contact feeler.

9. In a test indicator for lathe and machine work, two slidable toothed racks arranged end to end, one of said racks being rotatable relatively to the other rack, a movable contact feeler, mechanism actuated by the contact feeler for moving said racks endwise, means actuated by one of the racks for indicating the degree of movement of the contact feeler, and additional means for returning the movable parts to their normal positions.

10. In a test indicator for lathe and machine work, a supporting shank, a head rotatably adjustable on the shank, a yoke mounted for tilting movement on the head, a sleeve rotatably adjustable on the yoke, a toothed rack slidable in the sleeve, a lever mounted on the sleeve and having one end provided with a contact feeler and its opposite end provided with a toothed segment, gear connections between said segment and rack, an additional sleeve mounted for rotary movement upon the first named sleeve, a dial mounted on the additional sleeve, an index finger movable around the dial, connections for transmitting motion from the rack to the index finger, and means for retracting the index finger and its actuating mechanism.

In witness whereof I have hereunto set my hand on this 24th day of March 1910.

FRANK LAPLANT.

Witnesses:
H. E. CHASE,
A. L. HUMPHREY.